United States Patent Office 3,510,355
Patented May 5, 1970

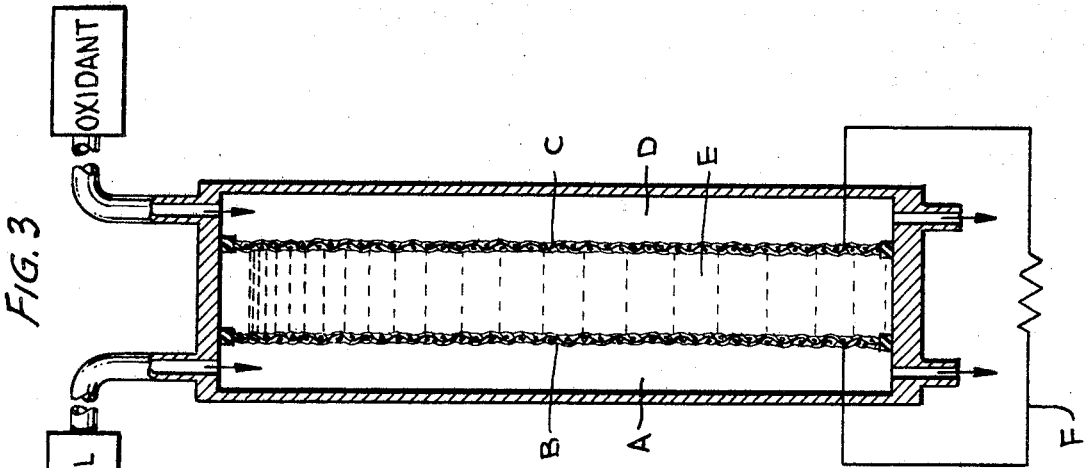
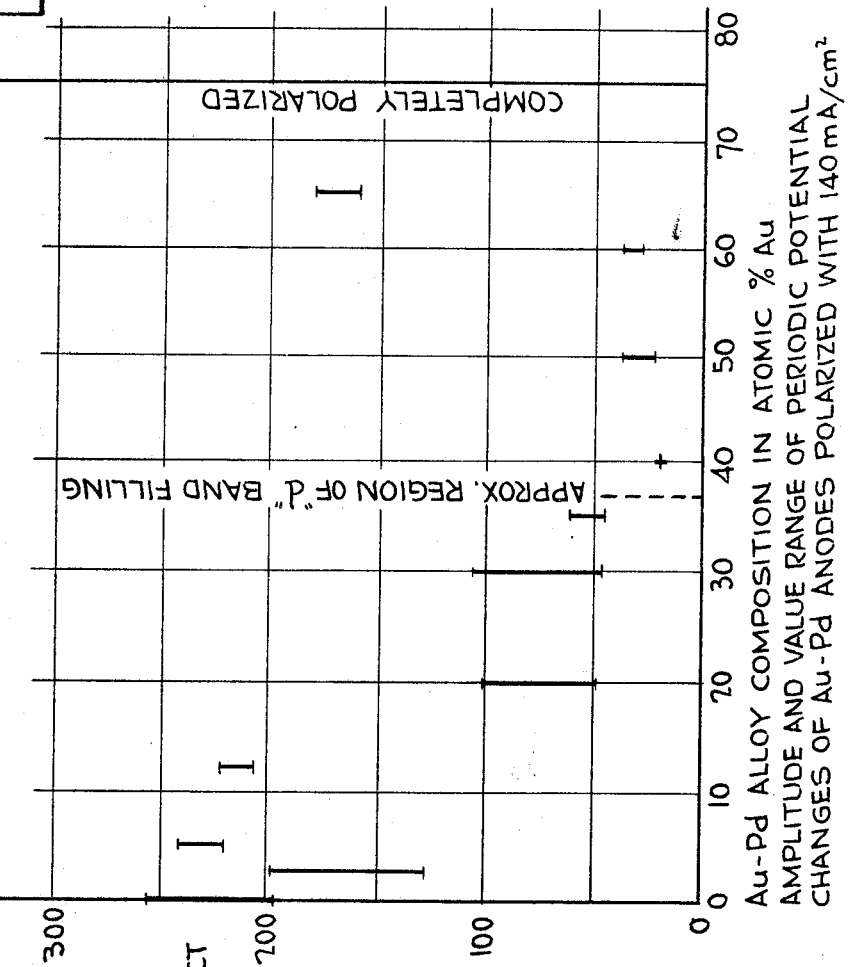

3,510,355
METHOD OF GENERATING ELECTRICITY COMPRISING CONTACTING A Pd/Au ALLOY BLACK ANODE WITH A FUEL CONTAINING CARBON MONOXIDE
Jerry Haskel Fishman, New York, N.Y., assignor to Leesona Corporation, Warwick, R.I., a corporation of Massachusetts
Filed Apr. 20, 1966, Ser. No. 543,841
Int. Cl. H01m 27/00
U.S. Cl. 136—86                              7 Claims

ABSTRACT OF THE DISCLOSURE

An improved fuel cell for the generation of electrical energy and a method of generating electrical energy utilizing a hydrogen-containing fuel having carbon monoxide present as an impurity is described. An electrode is utilized which is resistant to carbon monoxide poisoning comprising an admixture of a hydrophobic polymer and a palladium/gold alloy containing 14 to 64 atomic percent gold.

---

Figure 2:
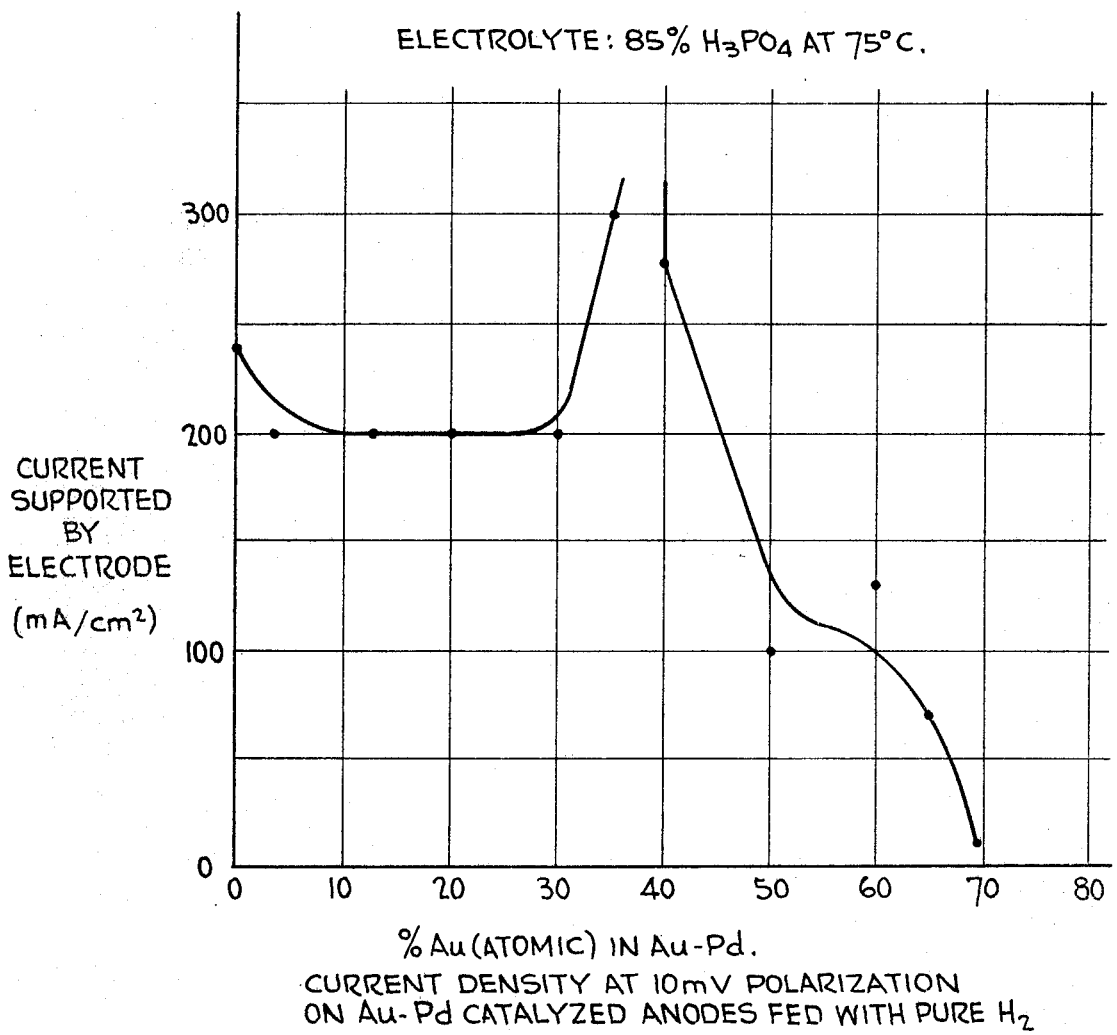

This invention relates to improved electrochemical cells and to novel electrodes for use therein. More particularly, the invention embraces a fuel cell primarily for consumption of impure hydrogen fuels containing carbon monoxide or carbonaceous fuels wherein the electrode in contact with the fuel is not substantially poisoned by carbon monoxide. The anode of the fuel cell comprises a palladium/gold alloy containing from about 14 up to about 64 atomic percent gold.

Fuel cells which comprise as essential elements a fuel electrode, an oxidizing electrode, and an electrolyte between said electrodes are devices for the direct production of electricity through the electrochemical combustion of a fuel and oxidant. These devices are recognized for their high efficiency as energy conversion units, since unlike conventional combustion engines, they are not subject to the limitations of the Carnot heat cycle.

In the present development of fuel cells, hydrogen-oxygen systems are in the production-engineering stage, primarily for space applications. However, the logistic and economic requirements of military and commercial applications necessitate operation on carbonaceous fuels, or on impure hydrogen obtained from the reforming of carbonaceous fuels. Unfortunately, however, while the carbonaceous fuels are theoretically consumable in fuel cells, difficulties are encountered in direct carbonaceous fuel consumption as a result of the inefficiencies of the electrochemical process at the anode and a progressive poisoning of the catalytic surface of the anode due to by-products of the anode reaction which include carbon monoxide. Moreover, since carbon dioxide is one of the products of the electrochemical reaction, sparingly soluble carbonates will be produced in an alkaline electrolyte, consuming the electrolyte and congesting the system. Thus, it is necessary to employ acid electrolytes.

In view of the difficulty encountered with direct conversion of carbonaceous materials, the suggestion has been made to break down the carbonaceous material in a chemical reformer and, thereafter, feed the reformed produce which is primarily hydrogen directly to the fuel cell anode. It is the common experience that the reform product contains a minor proportion of carbon monoxide. It is a further experience that the feeding of the impure hydrogen stream containing the carbon monoxide to the catalytic surface of the electrode causes progressive poisoning and consequent deterioration of the electrochemical performance of the cell. Therefore, it has been necessary to carefully purify the hydrogen stream obtained from the reformer prior to its passage to the anode to obtain a reasonable lifetime for the cell anode. In addition to the need to have more ancillary equipment, the purification units are generally operated at high temperatures and pressures, rendering the expediency undesirable.

Accordingly, to have a fuel cell for direct oxidation of a carbonaceous fuel or for operation on an impure hydrogen stream containing carbon monoxide, it is necessary to have a fuel cell anode which is resistant, or substantially resistant, to carbon monoxide poisoning; is not corroded by acid electrolytes; and in the event a carbonaceous fuel is used directly, is a good catalyst for the electrochemical oxidation of the carbonaceous material.

Therefore, it is an object of the present invention to provide a fuel cell for the consumption of fuels containing carbon monoxide comprising an anode having the aforesaid properties wherein at least a catalytic surface of said anode comprises a palladium/gold alloy, said alloy containing from about 14 up to about 64 atomic percent gold.

It is another object of the present invention to provide a fuel cell for the consumption of impure hydrogen containing carbon monoxide comprising an anode having the aforesaid properties wherein at least a catalytic surface of said anode comprises a palladium/gold alloy, said alloy continuing from about 14 up to about 64 atomic percent gold.

It is another object of the invention to provide an electrode for an electrochemical device which will not be substantially poisoned when in contact with an impure hydrogen stream containing carbon monoxide comprising a palladium/gold alloy, said gold being present at from about 14 up to about 64 atomic percent.

It is another object of the invention to provide an electrode for an electrochemical device which will not be substantially poisoned when in contact with an impure hydrogen stream containing carbon monoxide comprising a palladium/gold alloy, said gold alloy being present at from about 35 to about 60 atomic percent.

It is another object of the invention to provide an electrode for an electrochemical device which will not be substantially poisoned when in contact with an impure hydrogen stream containing carbon monoxide comprising a palladium/gold alloy, said gold alloy being present at from about 40 atomic percent.

It is another object of the invention to provide a catalyst primarily for use in a fuel cell anode operated on impure hydrogen streams, which catalyst is not substantially poisoned when in contact with carbon monoxide.

It is another object of the present invention to provide an improved catalyst for use in an electrochemical device which catalyst is not substantially poisoned by carbon monoxide comprising a palladium/gold alloy, said gold being present at from about 14 up to about 64 atomic percent.

It is another object of this invention to provide an improved catalyst for use in an electrochemical device which catalyst is not substantially poisoned by carbon monoxide comprising a palladium/gold alloy in homogeneous admixture with particles of a hydrophobic polymer, said gold being present at from about 14 up to 64 atomic percent.

It is another object of the present invention to provide a fuel cell for operation upon impure hydrogen streams comprising a cathode, an anode, and an acid electrolyte between said anode and cathode, wherein the anode comprises a palladium/gold catalyst, said gold being present at from about 14 up to about 64 atomic percent.

It is another object of the present invention to provide a method of generating electricity directly from an oxidant and fuel in a fuel cell comprising an anode, cathode, and an acid electrolyte between said anode and cathode comprising feeding an impure hydrogen fuel containing carbon monoxide to an anode not subject to poisoning when in contact with carbon monoxide, feeding an oxidant to said cathode at a temperature of from about 45 to 200° C., and withdrawing electrical current from said cell, the anode comprising a palladium/gold catalyst, with the gold content of the catalyst being from about 14 up to about 64 atomic percent.

It is another object of this invention to provide a fuel cell for operation upon pure hydrogen comprising a cathode, an anode, and an acid electrolyte between said anode and cathode wherein the anode comprises a palladium/gold catalyst, said gold being present at from about 30 to 45 atomic percent.

These and other objects of the invention will be more fully apparent from the following detailed description, with particular emphasis being placed on the working examples and drawing.

According to the present invention, it has been discovered that select alloys of palladium and gold comprising from about 14 up to about 64 atomic percent gold are not substantially poisoned by carbon monoxide contamination and have excellent resistance to strong acid electrolytes. The alloys are good electrochemical catalysts for the oxidation of carbonaceous fuels. In addition to exhibiting extremely low polarization, the electrodes comprising the alloys maintain a substantially constant potential when placed under current loads. The exceptional electrochemical performance of these alloys is unexpected, particularly since pure palladium electrodes, while capable of sustaining relatively high current densities, are readily poisoned by carbon monoxide and, thus, exhibit excessive polarization and fluctuations of potential when placed under a constant current load. Pure gold electrodes are only capable of sustaining negligible current densities and, thus, are not suitable. Alloys of palladium/gold outside the aforesaid range, although in part superior to pure palladium with respect to carbon monoxide poisoning, are still significantly detrimentally affected and, therefore, unsuitable for use with impure hydrogen.

Although it is not completely understood why the select alloys noted herein are not poisoned by carbon monoxide, it is theorized that the bonding of carbon monoxide to the surface of a platinum group metal catalyst is stronger than that of hydrogen or the hydrocarbons. The carbon monoxide, thus, collects on the surface, eliminating reactive sites for the hydrogen or hydrocarbon fuel. Therefore, to effectively oxidize a hydrocarbon or hydrogen in the presence of carbon monoxide impurities, one of the essential characteristics of the catalyst is that the surface bond formed with the carbon monoxide be weaker than the bond formed with hydrogen or with the hydrocarbon, respectively. It has been found that the bonding of adsorbed species in the surface of metals is characterized by the electronic configuration of the metal. Thus, s, p-metals chemisorb a gas such as carbon monoxide by processes which seem to be markedly different from the processes by which metals with d-band vacancies chemisorb the same gases, and in all probability with markedly different surface bond strength. Similarly, the surface bond strength of hydrogen at s, p-metals differs from that of metals with d-vacancies. Moreover, it has been found that metals with d-band vacancies such as the platinum group metals may be alloyed with metals such as those of Group I–B whereby the d-band vacancies can be filled completely or to varying degrees. Therefore, the alloying of a platinum group metal with a I–B group metal presents a possibility of affecting the relative strength of the bond that the metal surface forms with carbon monoxide on the one hand and with hydrogen or a hydrocarbon on the other hand. It appears, therefore, that in the present instance, the compositions of the select alloys set forth herein lie in the region where the d-band is just filled, promoting the strong adsorption of hydrogen or hydrocarbons and a consequent looser bonding of the carbon monoxide species. According to the aforesaid theory, the alloys to be selected herein will have the d-band vacancies of the palladium group metal substantially filled by the gold species.

It will be apparent from the following detailed description, with emphasis being placed on the experimental data, drawing, and working embodiments, that a pronounced desirable electrochemical effect is obtained by alloying the palladium and gold in the select ratios indicated. In the drawing, as will be more fully apparent hereinafter, FIG. 1 is a plot of the data illustrating the superior polarization characteristics of the select alloys and illustrates the relatively constant potential; FIG. 2 illustrates the superior electrochemical characteristics of specific alloys when fed with pure hydrogen; and FIG. 3 is a diagrammatical illustration of a fuel cell of the type employed in Examples 1 and 2.

To demonstrate the aforesaid superiority of the select palladium/gold alloys over pure palladium, pure gold, or alloys of palladium/gold having compositions outside the select range, in the critical area of carbon monoxide contamination, a series of tests were conducted employing various ratios of gold in a palladium/gold alloy. The electrodes tested employed the gold/palladium alloys in finely divided form, hereinafter referred to as "blacks," prepared by the following procedure designed for the production of one 1 gram sample of catalyst:

(1) One liter of water was added to a 2 liter beaker and ice cubes added to the water with agitation to obtain a water temperature of 15° C. Thereafter, 1.5 grams of potassium borohydride ($KBH_4$) was added to the water in the beaker.

(2) A mixed solution of the chlorides in the desired ratios of gold and palladium was prepared in 50 milliliters of water and, thereafter, added with rapid agitation to the aqueous solution of potassium borohydride.

(3) Agitation was continued until the supernatant was clear which indicates a complete reduction of salts (it may be desirable to test a small portion of the supernatant with $KBH_4$ to ensure complete reduction of the salts).

(4) The black was allowed to settle from the supernatant, and the supernatant decanted from the top of the black.

(5) The metal black was washed with 1.5 liters of water maintained at a temperature of about 70 to 80° C., and thereafter filtered through a Buchner funnel. The precipitate was washed in the funnel with water, transferred to a Petri dish, covered with water, and heated to dryness at 85° C.

(6) The product was sieved through a 325 mesh screen.

The metal black alloys obtained by the aforesaid method were examined by X-ray diffraction. The lattice parameters were found to correspond closely to those of bulk metal gold/palladium alloys. This correspondence constitutes a verification of the composition of the powder samples and indicates the alloy nature of the product.

Electrodes were fabricated from the resultant blacks by compounding the blacks with a dispersion of polytetrafluoroethylene at a 10 to 3 solid weight ratio of black/polytetrafluoroethylene and, thereafter, bonding the catalytic paste to the surface of a polytetrafluoroethylene film which is gas permeable. Approximately 7 milligrams of black was disposed per centimeter of film. A 52 mesh platinum screen was placed in contact with the catalytic paste to serve as a current collector. The system was mounted in a cell with the catalytic paste on the electrolyte side of the electrode.

The test electrodes were compared in an electrolyte system comprising 85 percent aqueous phosphoric acid ($H_3PO_4$). The operating temperature was 75° C. A reactant gas comprising 75.3 percent hydrogen; 24.6 percent carbon dioxide; and 0.1 percent carbon monoxide was fed through the unactivated surface of the electrode.

The blacks tested comprised 0.0 percent gold; 2.5 atomic percent gold; 12 atomic percent gold; 20.0 atomic percent gold; 30.0 atomic percent gold; 35.0 atomic percent gold; 40.0 atomic percent gold; 50.0 atomic percent gold; 60.0 atomic percent gold; 65.0 atomic percent gold; and 75.0 atomic percent gold, with the remainder being palladium. The data obtained is plotted as FIGURE 1 of the drawing. From the curve, it is apparent that substantially improved polarization characteristics are obtained in the region from about 14 up to 64 atomic percent gold, with the most marked improvement occurring in the region of 35 to 64 atomic percent gold. The lowest polarization occurs in the region of 40 atomic percent gold and, thus, it is the preferred alloy.

As further apparent from an examination of the data, the systems comprising from 35 to 60 percent gold demonstrated not only improved activity, but a substantially constant potential when placed at a constant current load of 140 ma./cm.$^2$. The optimum stability was obtained using a system comprising 40 atomic percent gold. An electrode activated with 75 percent gold/palladium failed to support a significant hydrogen oxidation current.

Moreover, as seen from the data plotted in FIG. 2 of the drawing, increased electrochemical activity is obtained when the anode is fed with pure hydrogen in the composition region where a substantially constant potential is reached in the presence of carbon monoxide, i.e., at from 30 to 45 atomic percent gold. This factor, not specifically explainable at this time, is associated with the characteristics of the alloy in the composition region where the d-band in palladium is just filled.

Although the aforesaid tests were conducted employing a hydrogen fuel stream containing carbon dioxide and carbon monoxide to demonstrate the resistance of the alloys to carbon monoxide poisoning, good results are obtained when using a carbonaceous stream which inherently contains minor amounts of carbon monoxide or where carbon monoxide is formed as a by-product of the anode reaction.

The improved electrodes of the present invention can comprise any of several forms. The exact nature of the electrode is not critical to the present invention. However, the preferred electrodes are those made up as lightweight electrodes which normally comprise a porous metal support coated with a catalytic material, such as a dispersion of the palladium/gold alloy black and a hydrophobic polymer. These electrodes are extremely thin and take up only a small amount of space, permitting the construction of highly compact cells having a high energy to volume and energy to weight ratio. The alloy blacks which are to be utilized can be formed by any of several procedures such as the potassium borohydride method described in detail hereinbefore. In addition to the potassium borohydride method, the blacks can be prepared by co-dissolving the chlorides of gold and palladium in the desired ratio in anhydrous methanol. The solution is placed in an ice bath, agitated vigorously and ammonia is bubbled into the solution to precipitate the metal complex. The precipitate is filtered and washed with anhydrous methanol to remove excess ammonia. Thereafter, the precipitate is dispersed in anhydrous methanol, the dispersion cooled and agitated vigorously. A 95 percent solution of hydrazine is added all at once (not dropwise) to the dispersion using 10 milliliters of hydrazine for every 5 grams of metal contained in the dispersion. The reduced metal black is thoroughly washed with distilled water, air dried, and sieved through a 325 mesh screen.

Another method of preparing the alloy blacks is the direct reduction of mixed aqueous solutions of gold and palladium chlorides with hydrazine. The reduced metal black is thoroughly washed with distilled water, air dried, and sieved through a 325 mesh screen.

Still another method of preparing the alloy blacks of the present invention is to form the alloy into wires or narrow strips by usual methods known in the art, such as drawing, etc. The alloy wires or strips are mounted in an ice bath as electrodes, i.e., an anode and cathode. A direct current potential of from about 150 to 200 volts is applied to the system and the wires brought into close proximity to establish an arc. The arcing erodes the metal and forms a fine suspension of alloy particles in water. The metal particles are filtered out as a finely divided black.

The blacks obtained by any of the aforesaid methods, or other methods known in the art, are used as such to activate an electrode or are admixed with hydrophobic polymer particles in various ratios. Suitable polymers are polytetrafluoroethylene, polytrifluoroethylene, polyvinylidene fluoride, polyvinyl fluoride, polytrifluorochloroethylene, and co-polymers thereof. Because of its exceptional hydrophobicity as well as its resistance to heat and the corrosive environment of the electrolyte, polytetrafluoroethylene is preferred. Normally, the polymer will be present in a weight ratio of from about 0.5 to 10 parts polymer per ten parts alloy black. The resultant dispersion or admixture of alloy black and hydrophobic polymer is applied to a conductive support. Thereafter, the coated support is heated sufficiently, but preferably below 300° C., to bond the polymer particles together and to the support. The admixture is applied to the conductive support by any of numerous means such as spreading with a flat knifelike surface, a doctors blade, or by brushing or spraying the admixture onto the support. Thus, the admixture can be in the form of a relatively fluid suspension or it can be in the form of a gel or paste. The heating operation is at temperatures sufficient to bond the polymer particles to each other and to the metal support. The electrodes obtained have excellent flexibiilty and are readily reproducible.

In addition to the aforesaid lightweight electrodes, the alloys of the invention can be employed as substantially non-porous structures wherein the reactant fuel gas is caused to flow against and around the electrode, or the structures can be made porous with the reactant gases passing through the electrode. The porous electrodes are either homoporous or bi-porous depending largely upon the ultimate use. The bi-porous electrodes are substantially more efficient in that the reaction interface of reactant gas, electrolyte, and solid electrode are more easily controlled. Moreover, the gold/palladium alloys of the present invention can be used as a catalyst to activate the surface area of less reactive materials such as stainless steel sinters, or porous carbon plates. The bi-porous and homoporous sinters and plates are prepared by methods known in the art, for example, as described in Bacon, U.S. Pat. No. 2,716,670, and in commonly assigned co-pending application Ser. No. 429,204 filed Jan. 21, 1965.

The fuel cells employing the electrodes described herein are normally operated at temperatures of from about 20 to 200° C. However, the temperature to a large extent depends upon the particular fuel employed in the fuel cell as well as upon the nature of the electrolyte. The limiting temperature of an acid electrolyte system is the boiling point of the electrolyte at the selected pressure, but the temperature range preferably is from 45 to 200° C.

Having described the novel electrodes of the present invention in general terms, the following detailed description sets forth working embodiments.

EXAMPLE 1

A fuel cell is constructed substantially as shown in FIG. 3 of the drawing. The anode B is prepared as follows:

A gold/palladium alloy comprising 40 atomic percent gold is prepared by mixing chlorides of gold and palladium in the proper ratio in anhydrous methanol. The solution is cooled to about 15° C. in an ice bath and a 95 percent solution of hydrazine is added all at once (not dropwise), using 10 milliliters of hydrazine for every 5 grams of metal contained in the solution. The reduced metal black is recovered, thoroughly washed with distilled water, air dried, and sieved through a 325 mesh screen. The metal black obtained is thereafter compounded with a dispersion of polytetrafluoroethylene in a 10 to 3 weight ratio of metal black to polytetrafluoroethylene (PTFE). The dispersion of metal black/PTFE is applied at a loading of 7 mg./cm.$^2$ metal black to one surface of a 7 mil thick gas permeable (liquid impermeable) polytetrafluoroethylene film and heated for ½ hour at 300° C. A 316 stainless steel wire screen (52 mesh) is implanted in the catalytic layer.

The cathode C comprises a catalyst made up of platinum black and polytetrafluoroethylene particles at a 10 to 6 weight ratio of black to PTFE. The black/PTFE admixture is applied at a loading of 10 mg./cm.$^2$ metal black to one surface of a 7 mil thick gas permeable (liquid impermeable) polytetrafluoroethylene membrane and cured by heating for ½ hour at 300° C. A 316 stainless steel wire screen (52 mesh) is implanted in the catalytic layer.

In the cell, the polymer membrane of the electrodes is in contact with the reactant gas and the catalytic layer is in contact with an 85 percent phosphoric acid ($H_3PO_4$) aqueous electrolyte E. The electrode spacing is ⅛ inch. The cell is maintained at 75° C. A fuel comprising an impure hydrogen mixture containing 75 percent hydrogen; 24.9 percent carbon dioxide; and 0.1 percent carbon monoxide is fed to compartment A behind the anode, at a pressure of ½ p.s.i.g. Air is fed to oxidant compartment D at a pressure of ½ p.s.i.g. The cell provided a current density of 150 ma./cm.$^2$ at 0.75 volt. The cell operated continuously for more than 150 hours with no noticeable change in performance.

EXAMPLE 2

A fuel cell was constructed and operated exactly as described in Example 1, except that the fuel fed to the anode comprised 99 percent hydrogen and 1 percent carbon monoxide. The cell provided a current density of 150 ma./cm.$^2$ at 0.74 volt. The cell operated in excess of 150 hours with no noticeable change in performance.

It should be appreciated that the invention is not to be limited to the illustrative examples. It is possible to produce numerous embodiments without departing from the inventive concept herein discolsed and covered by the appended claims.

What is claimed is:

1. A method of generating electrical energy which comprises bringing a fuel containing carbon monoxide into simultaneous contact with an acid electrolyte and a fuel electrode comprising an electrocatalyst consisting essentially of a palladium/gold alloy black composed of from 14 to 64 atomic percent gold, simultaneously bringing an oxidant into contact with said electrolyte and an oxidant electrode, and connecting said oxidant electrode and said fuel electrode by means of an external electrical circuit which receives the generated electricity.

2. The method of claim 1 wherein the palladium/gold alloy is composed of from 30 to 60 atomic percent gold.

3. The method of claim 1 wherein the palladium/gold alloy is composed of about 40 atomic percent gold.

4. The method of claim 1 wherein the acid electrolyte is 40 to 85 percent aqueous phosphoric acid.

5. The method of claim 1 wherein the fuel is essentially hydrogen.

6. The method of claim 1 wherein the palladium/gold alloy black is admixed with a dispersion of a hydrophobic polymer.

7. The method of claim 1 wherein the hydrophobic polymer is polytetrafluoroethylene.

References Cited

UNITED STATES PATENTS

| | | | |
|---|---|---|---|
| 2,384,463 | 9/1945 | Gunn et al. | 136—86 |
| 3,223,556 | 12/1965 | Cohn et al. | 136—86 |
| 3,239,382 | 3/1966 | Thompson | 136—86 |
| 3,288,653 | 11/1966 | Holt et al. | 136—86 |

FOREIGN PATENTS

| | | |
|---|---|---|
| 1,074,561 | 6/1964 | Great Britain. |

OTHER REFERENCES

J.E.C.S., September 1964, p. 1015.

WINSTON A. DOUGLAS, Primary Examiner

H. A. FEELEY, Assistant Examiner